United States Patent
Tomlin

[15] 3,703,270
[45] Nov. 21, 1972

[54] MOUNTING MEANS
[72] Inventor: Robert Derrick Tomlin, Hampton Hill, England
[73] Assignee: Magnatex Limited, Hounslow, Middlesex, England
[22] Filed: Oct. 20, 1970
[21] Appl. No.: 82,373

Related U.S. Application Data

[63] Continuation-in-part of Ser. No. 729,210, May 15, 1968.

[52] U.S. Cl. ............................248/475 A, 287/21
[51] Int. Cl. ................................................B60r 1/04
[58] Field of Search..248/481, 484, 475 A, 276, 479; 350/288; 287/12, 21, 87; 24/208.3, 217

[56] References Cited

FOREIGN PATENTS OR APPLICATIONS

| 25,898 | 5/1956 | Germany................248/479 |
|---|---|---|
| 1,246,937 | 10/1960 | France....................248/475 A |
| 1,196,266 | 12/1966 | Great Britain.............248/476 |
| 1,024,220 | 3/1966 | Great Britain............24/208.3 |
| 1,096,178 | 12/1967 | Great Britain.............248/475 |

*Primary Examiner*—J. Franklin Foss
*Attorney*—Edwin E. Greigg

[57] ABSTRACT

The invention relates to a construction of vehicle rear-view mirror which conforms with the Federal Safety Regulations concerning interior mirrors, namely, that the mirror mounting shall break away or deflect or collapse when struck by a force of 90 lbs. The mounting comprises a ball head on the mirror arm which fits within a complementary socket of a resilient plastics material, such as "Delrin", forming the base part of the mounting. The arm also carries a shoulder which abuts the top of the base part and forms therewith a fulcrum about which the arm rocks to force the ball head out of the socket when the mirror is struck.

7 Claims, 10 Drawing Figures

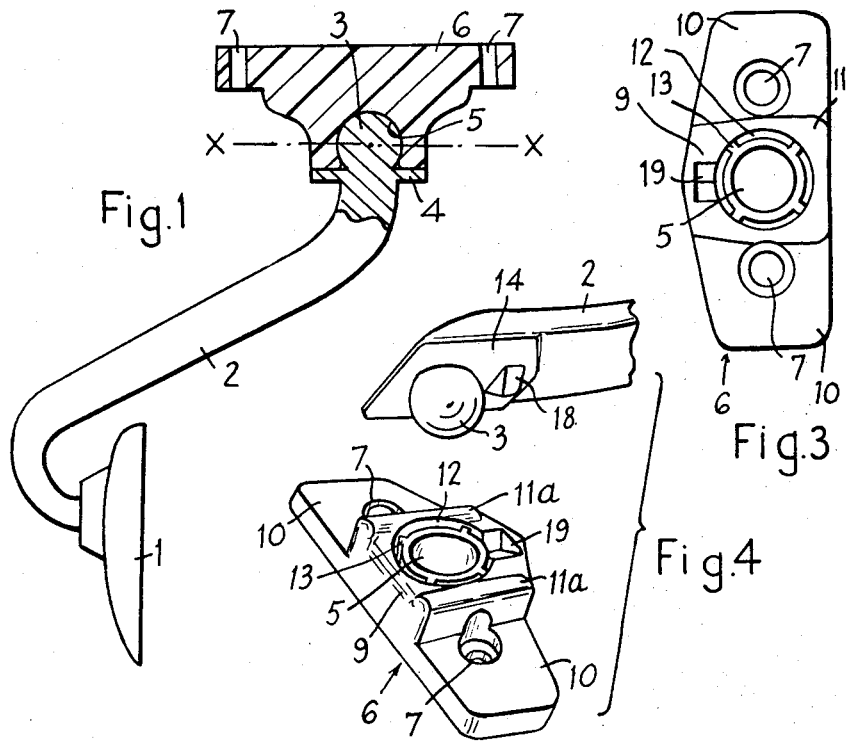
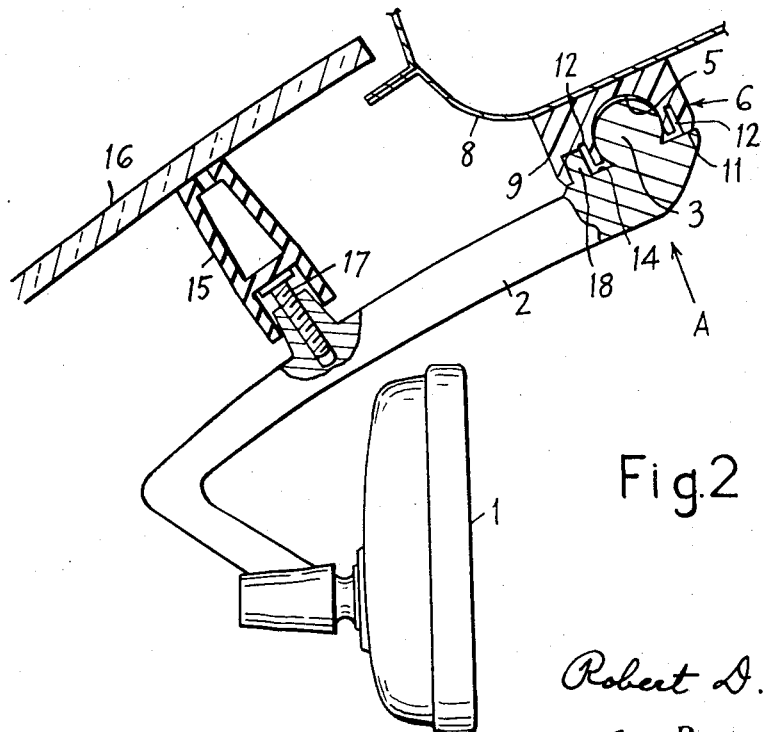

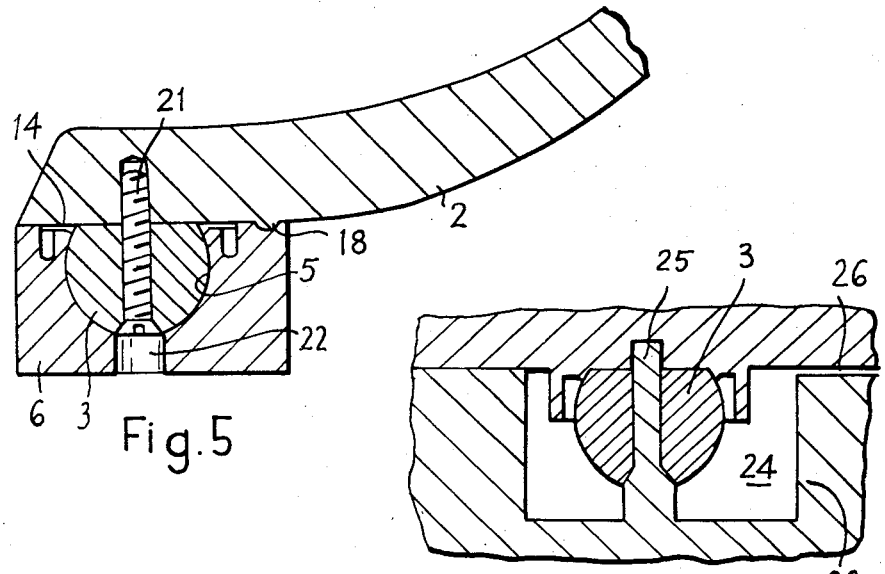
Fig.5    Fig.6
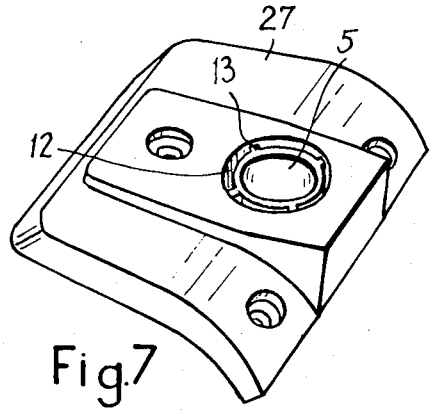 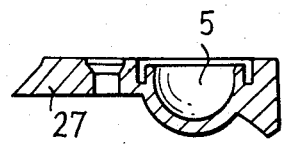
Fig.7    Fig.8
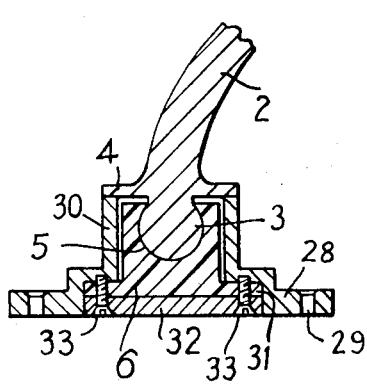 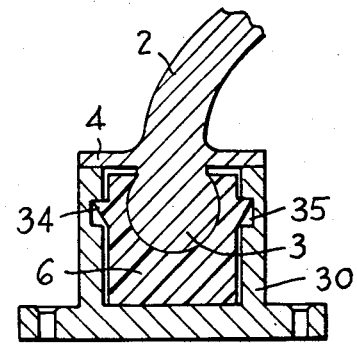
Fig.9    Fig.10

MOUNTING MEANS

This application is a continuation-in-part of my copending application Ser. No. 729,210 filed May 15, 1968.

The present invention relates to blow-releasable mounting means and more particularly to a safety rear-view mirror assembly for vehicles including a blow-releasable connection means between the mirror and the base part by means of which the mirror assembly is adapted to be secured to the vehicle and which, while under normal conditions firmly secures and supports the mirrors on the vehicle body, can, when struck by an abnormal blow, allow the mirror to become detached from the base part whereby, for example in the event of an accident and a person within the vehicle being thrown against the rear-view mirror, the latter will be detached and the risk of injury to the person, by striking the mirror, will be reduced.

The invention consists in a safety rear-view mirror assembly for vehicles including a blow-releasable connection means between the mirror and the base part by means of which the mirror assembly is adapted to be secured to the vehicle, said blow releasable connection means comprising first and second separable parts, said first part being provided with an undercut head, the underside of the head being inwardly tapered or curved, and having a shoulder extending outwardly adjacent the termination of the inwardly tapered or curved underside of the head, and said second part comprising a member of resilient plastics material having a socket cavity in which said undercut head of the first part is fitted, said socket cavity having a mouth of smaller size than said head, the plastics material at said mouth being expandable to allow said head to be withdrawn therethrough to separate the two parts, said shoulder, when said head is fitted in said socket cavity, abutting or lying close to a part at the mouth end of said second part and constituting with said shoulder a fulcrum about which said first and second parts can rock to withdraw the head from the socket cavity when the mirror receives a blow exceeding a predetermined value.

In one embodiment of the invention as applied to a vehicle interior rear-view mirror, the resilient plastics socket part constitutes a base part from which the mirror supporting arm, provided with the undercut head and shoulder at one end, is carried. The base part is adapted to be secured to the vehicle body. The mirror head is carried from the free end of the supporting arm. Upon the mirror receiving an abnormal blow, the supporting arm rocks about the fulcrum defined by the shoulder on the arm and an adjacent surface of the base part whereby the head is forced out of the socket cavity.

In another embodiment, the socket cavity may be formed in a part at the back of the mirror head and be mounted on the head at the end of a supporting arm or member secured to the vehicle body.

Preferably the head is constituted by a ball member and the socket cavity is of corresponding part-spherical shape in which the ball tightly fits. The surface or parts of the surface of the plastics moulding around the mouth of the socket cavity may constitute the part against which the shoulder abuts and fulcrums. According to a feature of the invention an annular recess is provided in the moulding around the mouth of the socket cavity in order to facilitate the expansion of the mouth when the head is forced out of the socket cavity. The force required to release the supporting arm is determined by the resilient properties of the plastics material and the position of the recess, and may be further controlled by the provision of radial webs or abutments disposed at spaced locations in the recess.

The mouth of the socket cavity is preferably disposed slightly below the level of the surface parts against which the shoulder abuts and the construction of the head and shoulder is preferably such that when the parts are assembled together the resilient material forming the mouth of the socket will urge the shoulder into firm abutting contact with the bearing parts to avoid rocking between the parts in normal use.

According to another feature of the invention, indexing means are provided for locating the first and second parts, when assembled, in a unique or one of several predetermined relative positions. It will be appreciated that if the headed member is spherical, then the supporting arm can be turned to several positions around the axis of the socket cavity and relies on the friction between the ball head and the socket for remaining in position. Positive indexing can be achieved by providing the two parts with inter-engaging projections or recesses or by providing the ball head with one or more flats or equivalent means cooperating with a complementarily shaped socket cavity.

In a preferred form, the indexing means includes cooperating inclined surfaces on said first and second parts respectively, such that upon the mirror receiving a blow in a direction tending to turn the part carrying the mirror about the axis perpendicular to the mouth of the socket cavity, the cooperating inclined surfaces of said indexing means will ride up one upon the other, the height of said cooperating inclined surfaces being such that turning movement between the first and second parts can move them relatively axially to an extent sufficient to withdraw the head from the socket cavity.

Conveniently, the indexing means comprises a V-shaped projection on said first part which locates in a V-shaped notch or recess in said second part.

In order that the invention may be more clearly understood, reference will now be made to the accompanying drawings, in which:

FIG. 1 is a section through an elementary embodiment of a rear-view mirror according to the invention.

FIG. 2 is a side elevation, partly in section, of another embodiment of rear-view mirror shown fitted to a part of a vehicle body, FIG. 3 is a view of the base part looking in the direction of the arrow A in FIG. 2, FIG. 4 is an exploded perspective view of the base part and the cooperating end of the supporting arm, but showing a modification of the bearing surfaces of the base part, FIG. 5 shows a section through a modified construction, FIG. 6 is a section through a moulding die explaining the method of making the embodiment of FIG. 5.

FIGS. 7 and 8 show a perspective view and section of another embodiment of base part.

FIGS. 9 and 10 show scrap sections of further embodiments.

FIG. 1 shows an elementary construction in which the principle of construction and operation of the mirror assembly according to this invention will be clearly apparent. In this embodiment the rear-view mirror 1 is carried from a supporting arm 2 having a ball head 3 at its end and a flange 4 forming a shoulder adjacent the undercut formation of the head defined by the inwardly curved surface of the ball between the plane indicated by the line X—X and the flange 4, said inwardly curved surface constituting the underside of the head. The ball head locates in a socket cavity 5 formed in a base part 6 moulded of a resilient plastics material and provided with apertures 7 for fixing the base part to a vehicle body.

The shoulder formed by the flange 4 abuts against the surface of the plastics moulding surrounding the mouth of the socket cavity 5 and upon the mirror being struck with a blow the ball head 3 is forced out of the mouth of the cavity by reason of the supporting arm 2 rocking about a fulcrum defined by a point on the periphery of the shoulder and the abutting surface of the moulding.

FIGS. 2 to 6 show a more practical embodiment of a vehicle interior rear-view mirror in which the supporting arm 2 for the mirror 1 is mounted on the base part 6, secured to the header bar 8 of the vehicle body, by a safety knock-out mounting according to the invention. The base part 6 is moulded of a resilient plastics material with a body portion 9 in which a part-spherical socket cavity 5 is formed, and lugs 10 provided with apertures 7 through which pass screws (not shown) for fixing the base part to the header bar.

The mouth of the socket cavity 5 is separated from the peripheral bearing portion 11 of the base by an annular recess 12, the continuity of which is interrupted by radial webs 13, preferably equally spaced therearound. The recess 12 extends into the moulding for such a depth that it reaches or almost reaches the level of the maximum diameter of the socket cavity.

Within the socket cavity 5 is located a metal ball member 3 projecting from the planar face 14 at the end of the supporting arm 1, said face 14 constituting a shoulder which abuts the bearing surface portion 11 of the base.

The surface of the moulding between the mouth and the recess 12 preferably lies just below the level of the bearing surface portion 11. This enables the shoulder 14 to be urged firmly against the bearing surface portion 11 to reduce vibration of the supporting arm. The distance between the shoulder 14 and the center of the ball head 3 is made slightly less than the distance between the level of the bearing surface portion 11 and the center of the socket cavity 5 so that the resilient plastics material forming the mouth of the cavity urges the shoulder 4 into firm contact with the bearing surface portion 11.

Instead of making the bearing surface portion 11 as a continuous annulus, it may be constituted by a plurality of raised surface elements. FIG. 4 shows such a modification in which the raised surface elements are constituted by ribs 11a. They may alternatively be constituted by, for example, three or more raised projections.

If desired the supporting arm 2 may carry a steady 15 adapted to bear against the windscreen 16 to reduce mirror vibration. The steady 15 is made of very resilient rubber and of such a construction that it can easily collapse if the supporting arm 2 is displaced by a blow. Adjustment of the steady is effected by the screw 17.

A suitable resilient plastics material from which the base part can be moulded is "Delrin" (Registered Trade Mark) supplied by DuPont. Other suitable materials are "Kamatol" supplied by Imperial Chemical Industries Ltd., polypropylene or polythene. The grade of the material used should be such as to provide the necessary resiliency to allow the mouth of the socket member to expand when the ball head is to be forced out on being struck with a force as prescribed by Official Safety Regulations whilst firmly holding the supporting arm under normal conditions of use. The Safety Regulations prescribed in the United States of America require that the mounting shall break away without leaving sharp edges, or deflect, or collapse, when the mirror is subjected to a force of 90 lbs in a forward or sideward direction in any plane 45° above or below the horizontal. The mirror assembly described with references to FIGS. 2 and 3 conforms with these requirements using "Delrin" of grade WT610 with four radial webs in the annular recess. The construction described enables the break-away force to be adjusted by modifying the grade of the resilient plastics material, the position of the annular recess and the number and position of the radial webs.

If it be desired that the supporting arm should not turn about the axis of the socket cavity perpendicular to the mouth thereof, indexing means may be provided for locating the arm in one or several predetermined positions relative to said axis. Such location is achieved with the embodiment described with reference to FIGS. 2 to 4 by providing the face 14 with a projection 18 which locates in a notch or recess 19 in the base part 6.

According to a feature of this invention, the indexing means comprises a V-shaped projection 18 which locates in a corresponding V-shaped recess 19 in the surface 11 of the body portion 9 of the base part 6 providing two pairs of cooperating inclined surfaces. The inclined surfaces of the projection 18 and the corresponding inclined surfaces of the recess 19 preferably converge at an angle of about 90°. Upon the mirror 1 receiving a blow tending to turn the arm 2 carrying the mirror about the axis perpendicular to the mouth of the socket cavity 5, one of the inclined surfaces of the projection 18 and the cooperating inclined surface of the recess 19, depending on the direction of the blow, will ride up one another. The height of the cooperating inclined surfaces of the projection 18 and recess 19 is such that the extent of axial movement between the arm 2 and base 6, at least when the above-mentioned turning movement is sufficient to bring the inclined surfaces out of engagement, is sufficient to withdraw the head 3 from the socket cavity 5. The recess 19 communicates at one end with the annular recess 12 surrounding the mouth of the socket cavity 5 and the corner at the apex of the projection 18 adjacent the closed end of the recess 19 is chamfered to avoid it fouling the end of the recess during the above-mentioned movement.

The mirror 1 may be supported from the end of the arm by a conventional adjustable joint.

The two parts of the mounting may be assembled by snapping the ball head in to the socket cavity. Alternatively the socket member may be moulded around the ball head as an insert in the moulding die. The ball head may be a separate component which is subsequently secured to the arm by means of a screw or in any other convenient manner. Such a construction is shown in FIG. 5 in which the ball head 3 is moulded as an insert in the base part 6 which may be shaped similar to that shown in FIGS. 2 to 4. The ball head is secured to the supporting arm 2 by a screw 21. To permit insertion of the screw, the base member is moulded with an opening 22 extending to the bottom of the socket cavity 5. This opening is formed by a core pin projecting into the hole in the ball member during the moulding operation.

FIG. 6 diagrammatically illustrates one form of mould cavity for moulding the base part with the ball member as an insert. The lower mould part 23 is formed with the cavity 24 in which the base part is moulded, a core pin 25 projecting upwardly from the bottom of the cavity 24 and supporting the ball member 3 in position. The mould cavity is closed by the upper mould part 26. Plastics material is injected into the mould cavity through the channel 26.

The base part and arm may assume shapes other than those described, and the portion of the base which contains the socket cavity, instead of projecting forwardly of the part of the base to be secured to the vehicle body, may extend rearwardly so that the mouth of the socket lies substantially flush with the surface of the vehicle body to which the base member is secured. One such construction is shown in FIGS. 7 and 8 from which it will be seen that the socket cavity 5 is formed in a part which projects rearwardly of the fixing plate 27. A base part constructed similar to that shown in FIGS. 7 and 8 may be secured within the header bar. Further, the base member may be incorporated with other components such as a "courtesy light" fitting.

In another construction according to the invention, the socket member moulded of resilient plastics material may be surrounded by a skirt of metal or other rigid material against which the shoulder on the supporting arm is adapted to bear and which serves as a fulcrum for the shoulder when the supporting arm is rocked upon receiving an abnormal blow.

FIG. 9 shows one embodiment of such a construction in which the socket member 6 of resilient plastics material is located in a metal base 28 provided with holes 29 for securing it to the vehicle. The base is formed with a skirt portion 30 which surrounds and projects slightly beyond the end of the socket member 6. The socket member is formed with a flange 31 which fits in a recess in the underside of the base, the socket member being secured in position by a plate 32 secured to the base by screws 33. The supporting arm 2 having the ball head 3 and shoulder 4 is releasably secured in the socket cavity, the arrangement being such that in this position the shoulder 4 bears against the end of the skirt 30. A slight clearance is provided between the skirt 30 and the socket member 6 to allow the mouth of the latter to expand slightly when the ball head is forced out of the socket cavity.

FIG. 10 shows an alternative method of securing the socket member in the metal base. In this form the socket member 6 is provided with a peripheral ridge 34 which, when the socket member is inserted in the base, engages in an annular recess 35 around the internal wall of the skirt 30 to retain the socket member therein.

The blow-releasable mounting according to this invention has the advantage that the two parts can easily be snapped together again after an accident in which the mirror has become detached, thus enabling the car, if not seriously damaged, to be driven with the rear-view mirror fitted back in place.

While particular embodiments have been described, it will be understood that various modification may be made without departing from the scope of the invention. For example the underside of the head can have other than a part-spherical shape, such as frustro conical or pyramidal. The head may also be shaped like a section of a cylinder.

The indexing means may comprise two of the V-shaped projections 18 provided on the face 14 at diametrically opposite sides of the head 3 which locate in two corresponding V-shaped recesses in the surface 11. The projections may be shallow V-Shaped projections extending across the width of the shoulder which fit in complementary shallow V-shaped recesses extending across the width of the surface 11. Further, the face 14 may have a shallow V-shaped profile and bear in a complementary shallow V-shaped recess constituting the surface 11. If several indexing positions are required, the opposing surfaces of the shoulder and the bearing surface or skirt may be formed with radial teeth.

Other means of indexing the position of the arm around the axis of the socket cavity may also be used. For example, the ball head may be provided with one or more flats or splines cooperating with a complementarily shaped socket. If the head has an undercut of pyramidal or other non-circular section, indexing is achieved by the configuration of the head.

I claim:

1. A safety rear-view mirror assembly for vehicles, including a blow-releasable connection means between the mirror and the base part by means of which the mirror assembly is adapted to be secured to the vehicle, said blow-releasable connection means comprising first and second separable parts, said first part being provided with an undercut head, the underside of the head being inwardly sloping and having a shoulder extending outwardly adjacent the termination of the inwardly sloping underside of the head, and said second part comprising a member of resilient plastics material having a socket cavity in which said undercut head of the first part is fitted, said socket cavity having a mouth of smaller size than said head, the plastics material at said mouth being expandable to allow said head to be forced therethrough to separate the two parts, said shoulder, when said head is fitted in said socket cavity, abutting parts of the surface of the moulding around the mouth of the socket cavity which constitute with said shoulder a fulcrum about which said first and second parts can rock to withdraw the head from the socket cavity when the mirror receives a blow exceeding a predetermined value, and said moulding being formed around the mouth of the socket cavity with an annular recess, and the mouth of the socket member being disposed slightly below the level of the parts against which the shoulder abuts such that the plastics material forming the mouth of the socket urges the head in a direction to hold the shoulder in firm abutting contact with said parts.

2. A safety rear-view mirror assembly for vehicles as claimed in claim 1, in which the undercut head is a ball and the first part comprises a supporting arm having said ball at one end and a mirror adjustably mounted at the other end, and said annular recess is interrupted by radial webs disposed at spaced locations therearound.

3. A safety rear-view mirror assembly for vehicles including a blow-releasable connection means between the mirror and the base part by means of which the mirror assembly is adapted to be secured to the vehicle, said blow-releasable connection means comprising first and second separable parts, said first part being provided with an undercut head, the underside of the head being inwardly sloping and having a shoulder extending outwardly adjacent the termination of the inwardly sloping underside of the head, and said second part comprising a member of resilient plastics material having a socket cavity in which said undercut head of the first part is fitted, said socket cavity having a mouth of smaller size than said head, the plastics material at said mouth being expandable to allow said head to be forced therethrough to separate the two parts, said shoulder, when said head is fitted in said socket cavity, being adjacent to parts at the mouth end of said second part and constituting with said shoulder a fulcrum about which said first and second parts can rock to withdraw the head from the socket cavity when the mirror receives a blow exceeding a predetermined value, and indexing means comprising cooperating cooperating means on said shoulder and the surface of the plastics material adjacent the mouth of the socket cavity, said cooperating means being a projection and a recess for locating said first and second parts in a predetermined position about the axis perpendicular to the mouth of the cavity.

4. A mirror assembly as claimed in claim 3, wherein the plastics socket member is provided around the mouth of the socket cavity with an annular recess.

5. A mirror assembly as claimed in claim 4, wherein said recess is interrupted by radial webs disposed at spaced locations therearound.

6. A mirror assembly as claimed in claim 3, wherein said indexing means includes cooperating inclined surfaces on said projection and recess respectively, such that upon the mirror receiving a blow in a direction tending to turn the part carrying the mirror about the axis perpendicular to the mouth of the socket cavity, the cooperating inclined surfaces of said indexing means will ride up one upon the other, the height of said cooperating inclined surfaces being such that turning movement between the first and second parts can move them relatively axially to an extent sufficient to withdraw the head from the socket cavity.

7. A mirror assembly as claimed in claim 6, wherein said projection is a V-shaped projection and said recess is a V-shaped recess receiving said projection.

* * * * *